Dec. 28, 1965     L. L. WILSTEIN     3,225,459

INSTRUMENT FLIGHT TRAINING HOOD

Original Filed Jan. 3, 1961

LEONARD L. WILSTEIN
INVENTOR.

BY *Albert M. Herzig*

ATTORNEY

United States Patent Office 3,225,459
Patented Dec. 28, 1965

3,225,459
INSTRUMENT FLIGHT TRAINING HOOD
Leonard L. Wilstein, 2803 Donella Circle,
Los Angeles, Calif.
Continuation of application Ser. No. 80,072, Jan. 3, 1961.
This application June 15, 1964, Ser. No. 375,174
2 Claims. (Cl. 35—12)

This application is a continuation of copending application Serial No. 80,072, filed January 3, 1961, now abandoned.

This invention relates to a new article of manufacture which is an instrument flight training hood. The invention is in the form of an article of head gear; it is a very light portable article which can be worn by the pilot of an aircraft and the purpose of which is to limit the area of view so that instrument or blind flying conditions are simulated.

The primary object of the invention is to provide the said new article of manufacture as well as to realize many other objects and advantages as will appear hereinafter.

It is a known fact that instrument weather is one of the chief causes of light plane and other casualties. The Federal Aeronautics Authority inaugurated a regulation in 1960 requiring instrument familiarization training for a private license and ten hours of instrument training for a commercial rating. These requirements are considered vital to the safety of pilots who suddenly or inadvertently fly into instrument weather conditions.

It has been found from studies that pilots who learned to observe and use flight instruments from the beginning of their flight training are much more proficient in holding altitude, attitude, headings, and air speeds in normal contact flight.

Blind flying equipment as known in the prior art is subject to substantial deficiencies. Some of it tempts the pilot to make visual references at any sign of disorientation. Other types create headaches or eye strain from looking through colored glasses or small holes or holding the head in an unnatural position. Still other equipment makes it difficult to read maps and approach charts or make calculations.

The invention herein overcomes these deficiencies and provides distinctly new advantages some of which are that the pilot is not distracted or tempted to make visual references. The training hood of this invention blocks out everything in viewing range but the instrument panel. The pilot maintains a normal position and can quickly and easily read a chart, and make calculations just as he would under actual instrument conditions. The realization of these advantages is among the objects of the invention.

The training hood of this invention provides an appliance having the foregoing features and advantages which is completely portable, inexpensive, light-weight, comfortable and adjustable, can be worn with eye glasses and is available at any time enabling a pilot to fly instruments whenever a safety pilot is aboard the aircraft.

The invention has many other detailed advantages and particular features which will become apparent from the following detailed description and annexed drawings, wherein.

Figure 1:
FIGURE 1 is a perspective view of a pilot wearing the training hood of the invention.
Figure 2:
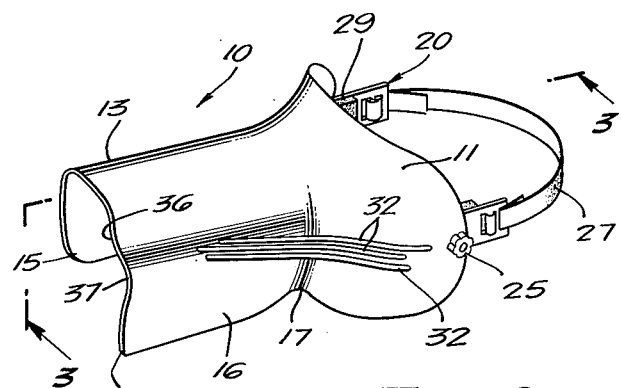
FIGURE 2 is a perspective view of a preferred form of the invention.

Referring now more in detail to FIGURES 1-4 of the drawing, the training hood of the invention is shown at 10 in FIGURE 1. It comprises a rear part 11 conformed to fit the upper and side parts of the wearer's face as shown in FIGURE 1. It has an extending beak as shown at 13 which is narrowed in a transverse direction, as may be seen in FIGURE 4, as well as in the up and down direction, as may be seen in FIGURE 3. The beak has downwardly extending side parts 15 and 16 which preferably have a slight curvature. Preferably, the hood 10 is an integral article and is made from a relatively thin, light, strong material such as a plastic or aluminum and the material may be fairly rigid, semi-rigid, or somewhat flexible.

Forwardly of the shaped part 11 (FIGURE 2) the sides of the hood are cinched in, as shown at 17.

Numeral 20 designates a head piece of generally U-shaped configuration which is preferably made of a light-weight, flexible plastic material. The head piece has laterally extending pieces or buttons, as shown at 21 and 22, which are threaded to receive threaded stems extending from adjusting knobs or buttons 24 and 25. The threaded steams of the buttons 24 and 25 extend through apertures in rear parts of the hood 10 whereby it may be adjustably supported as will be described more in detail hereinafter. The ends of the head piece 20 are slotted, as shown, to receive the ends and to hold the ends of a flexible or elastic head band 27 which adjusts and holds the hood in position on the wearer's head, as shown in FIGURE 1.

The safety pilot is required to visually observe other traffic in the air when any simulated instrument device is in use.

From the description so far, it will be observed that the training hood provides direct vision which is an outstanding characteristic of the device. In other words, the wearer looks directly at the instrument panel of the aircraft. It is not subject to the great disadvantages of many prior art devices including dangerous limited vision of the safety pilot occurring in the use of blue or other type goggles with amber or other shields that are applied over complete cockpit windows which provide obstructions and restriction of vision of both the safety pilot and the trainee, nor are there any other obstructions such as restrictive slots. Such obstructions were very hampering to a pilot particularly in marginal lighting. In addition, it was very difficult to read approach plates, charts, maps, or use computing devices necessary in instrument flying. The problem also existed with amber and blue to the extent of its being completely unusable at night when limited lighting exists, as the safety pilot could not see through the amber shield on the windshield adequately, if at all. The hood of this invention, enabling direct vision through the front of the beak and directly downward through the bottom, creates the same natural setting that a pilot has when flying under actual instrument conditions. There are no shields to install on cockpit window and safety pilot has complete normal viewing to the outside.

From the foregoing, it will be observed that the characteristic of direct vision is achieved while still realizing substantial other advantages. As explained in the foregoing, the rear portion 11 which surrounds the face is flared out wider than the front beak. This keeps all portions of the hood with the exception of the head band away from the face, enabling the pilot to wear eye glasses when wearing the hood. In the past, there have been considerable problems with pilots who wear glasses with respect to using known types of training equipment. The construction described also provides adequate ventilation around the face, giving exceptional comfort when wearing the hood. It is to be recognized, of course, that instrument flying is a rugged psychological and physical experience and any contribution to the pilot's comfort, well-being and orientation is of importance. Quite often pilots will perspire profusely under the mental strain of instrument flying. The herein invention eliminates or limits the discomforts and distractions attendant to use of previously known equipment.

The manner of support of the hood on the wearer's head contributes markedly to the pilot's comfort. The head piece 20 is provided on the inside thereof with a strip or layer of foamed plastic material 29 which is soft and pliable. The configuration of the head band distributes all of the weight of the hood around the head and removes the center of gravity from the end of the beak and eliminates discomfort or a weight effect tending to pull the pilot's head down.

The materials used as explained are fully compatible to the head and skin and to human tissue. The head piece 20 may be provided with elongated slots for further flexibility and ability to conform to the contour of the wearer's head. The elastic band 27 is attached by way of the slots in the ends of the head piece 20. Preferably, there are three of these slots, as may be seen in FIGURE 2, through which the band is threaded. The knobs 24 and 25 with threaded stems provide a highly convenient and advantageous swivel adjustment. This important feature of the hood allows up and down adjustment of the beak so as to enable the pilot to fly underneath the hood or immediately come out from underneath it by swiveling it to the up position, this being a procedure which is necessary in basic training or in making a low instrument approach. It is further of extreme importance in the adjustment of the hood as it provides an unlimited range of angles of positioning which makes the hood unique in that it is adjustable to all varying configurations of instrument panels and to all the particular heights and positions in which the pilot sits. In other words, one pilot might sit lower relative to the panel than another, and pilots in different aircraft may have different heights, but through the swivel adjustment of the hood all of these conditions can be accommodated.

The invention provides further significant advantages from the standpoint of the flight instructor or inspector. Provided on the sides of the hood are lines as designated at 32 and these may be conveniently formed by way of embossments in the sides of the hood. These lines provide a physical and visual method or means for determining the maximum viewing height of the wearer of the hood. The three embossed lines shown on each side of the hood originate from three basic positions on the rear portion of the hood which are at a level corresponding substantially to the average eye levels of the majority of individuals who might wear the hood. All three lines converge to a point which at the extended position gives a visual reference to the maximum viewing height the pilot sees when wearing the hood. Instructors and flight inspectors while flying with the pilot may make reference to and visually extend these lines beyond the end of the beak of the hood to a point on the panel in order to determine the maximum viewing height of the pilot. This is of particular significance to the instructors or inspectors since it gives them a means of determining whether or not on any occasion the pilot is looking out over the top of the panel or otherwise making the visual references to the outside rather than the instrument panel. The nature of the hood is such that this feature provides a clear and decisive indication that the pilot is or is not getting outside references. It is significant that there is no distraction of concentration on the part of the inspector to extend these lines mentally which distraction might take any undue attention from him during the period he is observing other air traffic while the pilot is flying underneath the hood.

The invention further makes possible the precise control and/or regulation of the area that is viewed by the wearer by means of contour or profile control or conformation of the beak. This control is exercised by shaping and conforming the outer edge of the beak. As shown in the figures, the side portions 15 and 16 of the beak have a slight curvature. The lower edge of the side 16 is extended further than other portions of the edge as designated at 35 in the drawings. This extension specifically limits or restricts viewing in aircraft which have extended lower windows on each side. These extended windows provide better pilot visibility in normal flight. The shape or profile 35 limits the vision by this extension on the lower left edge of the side 16.

At the upper part of the side 16, there is a slight extension 36 and, just below it, a portion of slightly increased eccentric curvature 37. The purpose of this configuration and profile is to provide a greater viewing radius on the left side only, which again conforms to the basic shape of instrument panels such as illustrated schematically in FIGURE 1. Inasmuch as they have greater radii than the smaller radius the sides 15 and 16 normally are provided with, by extending the edge as at 36 and 37 to provide a specific profile, the viewing radius is increased as seen by the pilot. Similar curvature is not provided on the right side of the hood as it is desired to have more viewing to the right. Additional viewing area may be provided on the right by trimming back the edge material on the right side of the hood.

Figure 3:
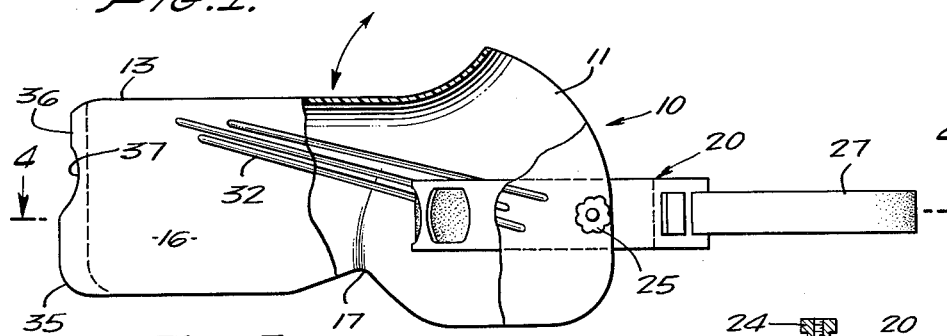
FIGURE 3 is a sectional view taken along the line 3—3 of FIGURE 2.
Figure 4:
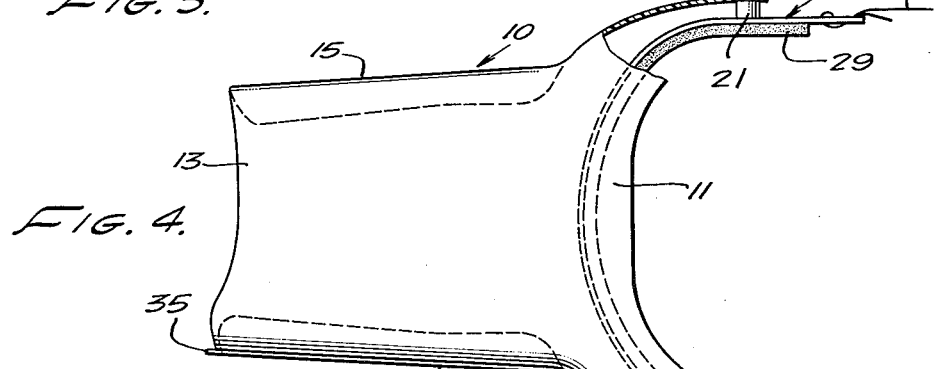
FIGURE 4 is a sectional view taken along the line 4—4 of FIGURE 3.

The hood as shown may be readily modified for use with standard civil and military head sets. This modification is made simply by trimming back from the edges of the enlarged part 11 in amounts necessary to accommodate the head sets. Such modification allows the hood to swivel up and down and be used in its normal manner without conflict with the ear phones in the manner described above. When used with ear phones, the hood is placed on the head first and then the ear phones are applied. The hood may have a trim line marked on it, as shown in FIGURE 3.

Figure 5:
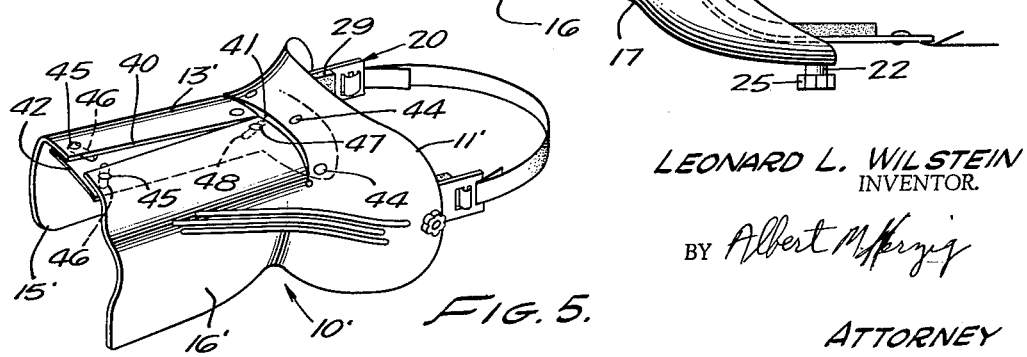
FIGURE 5 is a perspective view of a modified form of the invention.

FIGURE 5 shows a modified form of the invention which is readily adjustable for increasing or restricting the viewing area. This form of the invention embodies a further advance in that it is made of a cloudy, milky-white material so that the interior of it simulates a cloudy sky, producing the same psychological and visual effect. The material is a plastic composition which, as used in this particular invention, is identified by the term "Transprobelene." The material is translucent. This modification of the invention has extremely significant characteristics. In instrument training under all previous types of hoods, there has been a definite attendant psychological disadvantage due to the confined closed-in effects. Secondly, they do not provide conditions associated with actual instrument flying conditions. Instrument flying has many physical, visual and psychological aspects. One of the greatest problems that an instrument pilot may encounter is vertigo. Vertigo can be caused by various effects and is directly related to an individual's physical being. A proficient instrument pilot must be able to fly adequately during a period of vertigo if it should develop. The great tendency is that the pilot believes his feeling rather than his instruments and this reaction has resulted in many fatal accidents. With the "Transprobelene," there has been provided an instrument which simulates authentic natural instrument flight conditions as closely as possible. Through the cloudy white material, there is simulated the cloud decks and layers normally visible in the sky so that the pilot feels both psychologically and physically as if he were in actual weather. Additionally, and more importantly, is the fact that peripheral light penetration may occur through this material while at the same time the pilot is restricted from making visual references. This peripheral light penetration commonly contributes to the cause of a pilot's developing vertigo and, for this reason, it is of tremendous learning and training value. Unquestionably, this would be the most significant simulated condition a pilot may be subjected to while still safely under instructions as he can then learn to fly adequately while subjected to vertigo. In addition, "Transprobelene" puts the trainee into the atmosphere that he will undoubtedly be flying in when actually in instrument weather. The significance of these advantages is of utmost importance.

The modified hood of FIGURE 5 is otherwise like that of the previous embodiment except for the lateral adjustment providing for extended vision. The upper part of the beak is cut longitudinally as indicated at 40, and the inner end of this cut intersects with a lateral cut 41 just forward of the flared part 11 of the hood. The material of the hood is sufficiently flexible so that the side parts 15' and 16' at the forward end can be pulled outwardly or adjusted outwardly to widen the gap at the cut 40 as shown in FIGURE 5. Underneath the cuts 40 and 41 there is provided a closure or piece 42 which spans the gap and prevents exposure directly through the cuts 40 and 41. The rear part of the piece 42 is formed to fit contiguously inside the upper part of the rear formed part 11' of the hood and it is attached thereto, for example, as by rivets 44. The front end of the part 42 is attached to the end parts of the beak by rivets or pins 45 which can move in slots 46 in the end parts of the beak, the slots having a direction to allow for relative movement between the part 42 and the end parts of the beak. Similarly, the inner part of the piece 42 is attached to the beak by pins or rivets 47 which can move relatively in slots 48 in the piece 42 having a direction to allow the relative movement.

The adjustment feature, as described in FIGURE 5, provides for extended vision. That is, this feature provides control means specifically for the purposes of widening or narrowing the viewing range laterally, that is to the left and right. It may be used in all sizes of aircraft from the smallest to the largest. The adjustment is a tension-type which may be effected simply by grasping the ends of the beak and adjusting to the desired position, the parts then remaining frictionally in the adjusted position. Adjustment can be made on one side or the other or on both sides or any combination. The adjustment gives a full range of lateral viewing and adjustment. This is of prime significance and importance in larger aircraft where various radio instruments and other equipment are set in different or unusual locations, and is usable from either pilot or co-pilot seats.

From the foregoing, those skilled in the art will observe that the invention is a distinctly new article of manufacture and that it achieves and realizes all of the objects and advantages as outlined. By virtue of its basic construction and combined features, it provides the ultimate in an effective simulated instrument flight training hood.

The foregoing disclosure is representative of preferred forms of the invention and is to be interpreted in an illustrative rather than a limiting sense, the invention to be accorded the full scope of the claims appended hereto.

What is claimed is:

1. An instrument flight training hood comprising a shield having means whereby it may be supported from a person's head, said shield having parts around the upper and side portions of the wearer's face and an extending beak part having downwardly extending side parts, the shield being open at the bottom whereby the area that may be viewed by the wearer is limited by the length and configuration of the beak, means whereby side parts of the extending beak may be adjusted transversely to provide a variable controlled area of view, the said beak being formed so that the forward ends of the side parts thereof may be spread outwardly angularly, and an additional piece of material spanning the gap between the side parts of the beak, the side parts having adjustable relationship with said additional piece.

2. An instrument flight training hood comprising a shield having means whereby it may be supported from a person's head, said shield having parts around the upper and side portions of the wearer's face and an extending beak part having downwardly extending side parts, the shield being open at the bottom whereby the area that may be viewed by the wearer is limited by the length and configuration of the beak, the said hood being made of a translucent plastic material having a milky white color and appearance thereof, whereby to simulate cloud decks and layers found in actual instrument flying, the beak being split longitudinally along its upper part, the hood having a transverse cut at the inner end of the longitudinal split, the said material being flexible whereby the outer ends of the side parts may be adjusted outwardly angularly, and means providing attachment allowing relative movement between the adjustable side parts and the additional piece of material.

References Cited by the Examiner
UNITED STATES PATENTS 2,572,656 10/1951 Ortenburger _____ 35—12
2,694,263 11/1954 Francis et al. _____ 35—12

EUGENE R. CAPOZIO, *Primary Examiner.*
LAWRENCE CHARLES, JEROME SCHNALL,
*Examiners.*